(12) United States Patent
Mulligan

(10) Patent No.: US 6,302,152 B1
(45) Date of Patent: Oct. 16, 2001

(54) FLEXIBLE CONNECTOR WITH IMPROVED BRAIDED SHEATHING

(75) Inventor: Timothy David Mulligan, New Hudsen, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 09/697,660

(22) Filed: Oct. 26, 2000

Related U.S. Application Data
(60) Provisional application No. 60/166,260, filed on Nov. 18, 1999.

(51) Int. Cl.[7] ................................................. F16L 11/10
(52) U.S. Cl. ...................... 138/125; 138/109; 138/127; 138/133
(58) Field of Search ................... 138/125, 127, 138/123, 109, 124, 133

(56) References Cited

U.S. PATENT DOCUMENTS

| | | | |
|---|---|---|---|
| 3,857,415 | * 12/1974 | Morin et al. ........................... | 138/125 |
| 4,159,027 | * 6/1979 | Caillet .................................... | 138/123 |
| 4,657,049 | * 4/1987 | Fourty et al. ......................... | 138/133 |
| 5,483,412 | * 1/1996 | Albino et al. ........................ | 138/125 |
| 5,555,915 | * 9/1996 | Kanao .................................... | 138/133 |
| 5,601,119 | * 2/1997 | Kanao .................................... | 138/133 |
| 5,622,210 | * 4/1997 | Crisman et al. . | |
| 5,655,572 | * 8/1997 | Marena ................................. | 138/127 |
| 5,778,941 | * 7/1998 | Inada .................................... | 138/127 |
| 5,803,129 | * 9/1998 | Coronado et al. . | |
| 5,927,345 | * 7/1999 | Samson ................................. | 138/127 |
| 5,988,226 | * 11/1999 | Matthews ............................. | 138/127 |

* cited by examiner

Primary Examiner—James Hook
(74) Attorney, Agent, or Firm—Edgar A. Zarins; Lloyd D. Doigan

(57) ABSTRACT

A flexible hose connector for delivering a fluid from a source to an end user or appliance. The hose connector generally includes a flexible hose body and end connectors. The hose body includes an interior tube having an inner fluid passageway and an outer reinforcing braided sheath. The braided sheath is formed of plastic coated strands of stainless steel for improved resistance to both corrosion and cutting of the sheath.

8 Claims, 2 Drawing Sheets

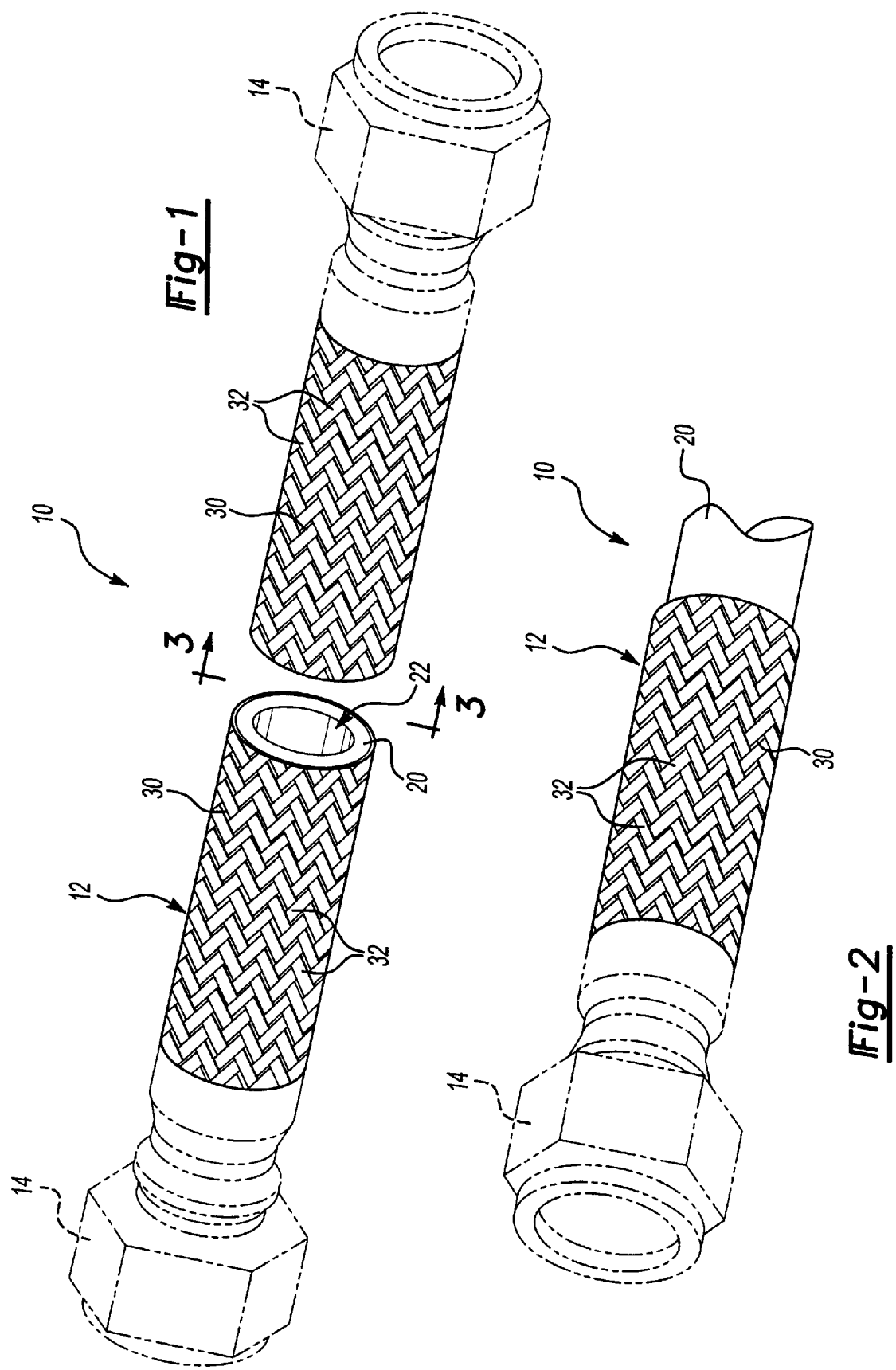

FLEXIBLE CONNECTOR WITH IMPROVED BRAIDED SHEATHING

RELATED APPLICATIONS

This application claims priority from U.S. Provisional Application No. 60/166,260 filed on Nov. 18, 1999.

BACKGROUND OF THE INVENTION

I. Field of the Invention

This invention relates to a flexible connector for conducting fluids and, in particular, to a flexible connector with a braided sheathing formed of PVC coated strands of stainless steel for improved cut and burst resistance.

II. Description of the Prior Art

Hoses are widely used to deliver fluids, such as water, from a source to an end use such as an appliance. A specific example includes a hose connected between a spigot and a washing machine for controlled delivery of water to the washer. The flexibility of a hose lends itself to convenient connection between the source and appliance. Simple hoses have been manufactured of rubber or plastic. However, such materials are unable to withstand the relatively high internal pressures particularly if environmental factors have corroded or degraded the hose material. Since these hoses are used within the home, a ruptured hose can result in substantial water damage.

In order to reduce the potential of a ruptured hose, a variety of reinforcing materials have been employed. Reinforcing materials have been molded into the rubber material as the hose is formed. A more recent development is the application of a reinforcing braid to the exterior of the hose. Stainless steel or other metals have been used as the braiding material. However, these metals are subject to corrosion and tend to reduce the strength of the connector hose. More recently, a plastic or polyester filament has been employed as the braiding material. However, these braiding materials are easily cut with any sharp object. Cutting or puncturing of the hose may occur when the product is installed or when the product is removed from its packaging using sharp tools.

SUMMARY OF THE PRESENT INVENTION

The present invention overcomes the disadvantages of the prior known hose connectors by providing a reinforced flexible hose connector having an improved outer sheathing braided with strands of plastic coated stainless steel.

The flexible hose connector of the present invention generally comprises a flexible hose body and end connectors for attaching the hose connector to a fluid source, an appliance or other device. Typically, the connectors are female threaded connectors which are rotatable independently of the hose body. However, end connectors of other configurations can be employed in accordance with the present invention. The flexible hose body includes an interior tube having an inner fluid passageway and an outer reinforcing braided sheathing.

In order to provide improved resistance to corrosion and cutting of the connector, the braided sheathing is formed of plastic coated strands of stainless steel or other metals. The plastic coating prevents corrosive agents from coming in contact with the stainless steel or other metals. As an alternative, the plastic coating may be applied to various other materials according to the desired properties of the fluid connector.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an exploded perspective view of a flexible hose connector embodying the present invention;

FIG. 2 is a partial perspective view of the connector;

DETAILED DESCRIPTION OF A PREFERRED EMBODIMENT OF THE PRESENT INVENTION

Figure 3:
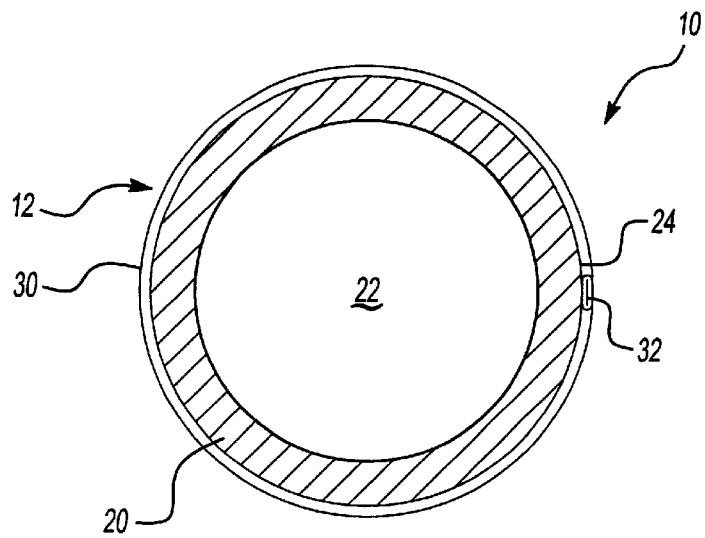
FIG. 3 is a cross-sectional view of the hose taken along lines 3—3 of FIG. 1.

Referring first to FIGS. 1 and 2, there is shown a flexible hose connector 10 for conducting fluid from a fluid source to an end use or appliance (not shown). The connector 10 generally includes a hose body 12 having connectors 14 secured to the ends of the body 12. The flexible hose 10 of the present invention is capable of withstanding the internal pressure of the fluid to prevent bursting while also preventing cutting from external sources. The hose 10 generally includes an inner tube 20 for conducting the water and a braided outer sheath 30 to protect the inner tube 20.

The inner tube 20 includes a fluid passageway 22 for conducting the water. The inner tube 20 may be made of a number of flexible fluid conducting materials including rubber or plastic. The inner tube 20 has an outer surface 24.

Figure 4:
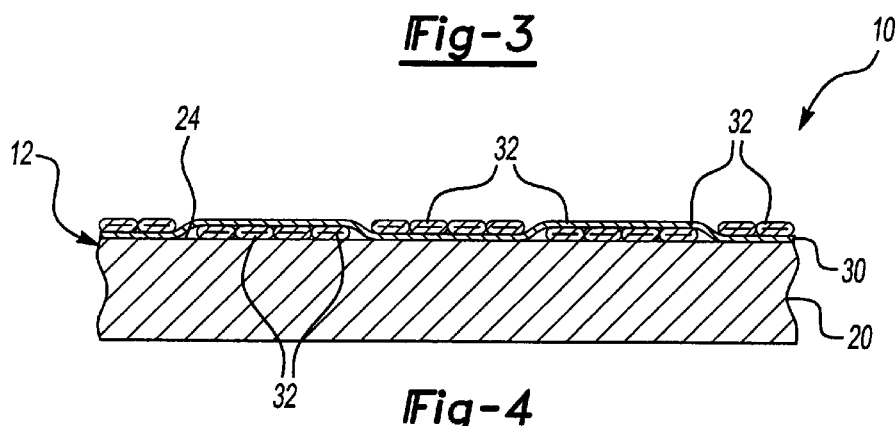
FIG. 4 is an enlarged partial cross-sectional view of the hose.
Figure 5:
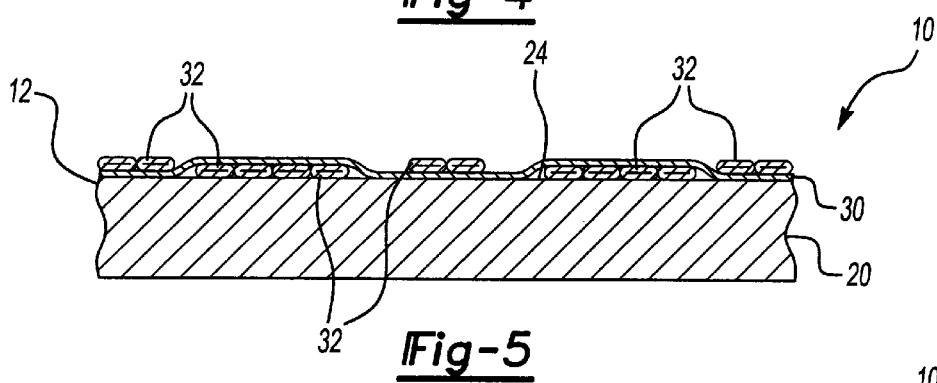
FIG. 5 is an enlarged partial cross-sectional view of an alternative embodiment.
Figure 6:
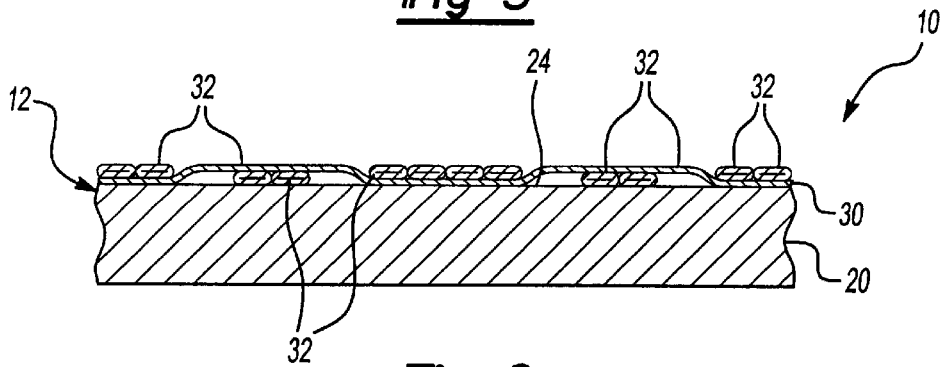
FIG. 6 is an enlarged partial cross-sectional view of another alternative embodiment.

Applied to the outer surface 24 of the inner tube 20 is the reinforcing braided sheath 30 which consists of a plurality of intertwined threads 32. In accordance with the present invention, the braided sheath 20 is formed of metal strands coated with a plastic material. The metal strands resist cutting while the plastic coating reduces corrosion of the metal strands. In a first embodiment of the sheathing 30, the strands 32 are stainless steel coated with a polyvinyl chloride (PVC). The arrangement or weave of the strands 32 may be altered as shown in FIGS. 4 through 6 according to the desired specifications of the connector 10.

Although the stainless steel strands coated with PVC provide optimum operating capabilities, the strands may be formed of a variety of materials. The plastic coated threads 32 may include a core of poly-aramid, linear low-density polyethylene, ultra-high molecular weight polyethylene, carbon filaments, nylon, fiberglass, poly-metaphenylene diamine, stainless steel, carbon steel, galvanized steel, aluminum, copper wire, any other textile fiber, metallic fiber or synthetic fiber. The plastic coating may include vinyl, PVC, polyethylene, or polystyrene.

The foregoing detailed description has been given for clearness of understanding only and no unnecessary limitations should be understood therefrom as some modifications will be obvious to those skilled in the art without departing from the appended claims.

What is claimed is:

1. A flexible hose connector for conducting fluids, said hose connector comprising:

a flexible hose body having a pair of remote ends; and a pair of connectors mounted to said ends of said hose body;

said flexible hose body including a braided sheathing formed of a plurality of interwoven plastic-coated metal strands, said metal strands individually coated with plastic prior to weaving to form said sheathing.

2. The hose connector as defined in claim 1 wherein said strands are formed of stainless steel.

3. The hose connector as defined in claim 2 wherein said stainless steel strands are coated with a polyvinyl chloride to encapsulate said stainless steel.

4. The hose connections as defined in claim 1 wherein said metal strands are formed of a material consisting of one of copper alloy and aluminum alloy.

5. The hose connector as defined in claim 4 wherein said metal stands are coated with a material consisting of one of polyethylene and vinyl.

6. The hose connector as defined in claim 4 wherein said metal strands are coated with a material consisting of one of urethane, epoxy, polypropylene and polyethylene.

7. The hose connector as defined in claim 1 and further comprising an inner hose liner, said braided sheathing formed on an outer surface of said liner.

8. The hose connector as defined in claim 1 wherein said strands are formed of a material consisting of one of carbon steel, brass and titanium.

\* \* \* \* \*